May 29, 1951 P. A. STEPHENSON 2,555,206
OSCILLATING ROLL DRIVE
Filed April 6, 1949 2 Sheets-Sheet 1

INVENTOR.
Paul A. Stephenson
BY Lewis A. Wright
Atty.

May 29, 1951 P. A. STEPHENSON 2,555,206
OSCILLATING ROLL DRIVE
Filed April 6, 1949 2 Sheets-Sheet 2

INVENTOR.
Paul A. Stephenson
BY Lewis A. Wright
Atty.

Patented May 29, 1951

2,555,206

UNITED STATES PATENT OFFICE 2,555,206

OSCILLATING ROLL DRIVE

Paul A. Stephenson, Evanston, Ill., assignor to A. B. Dick Company, Chicago, Ill., a corporation of Illinois Application April 6, 1949, Serial No. 85,873

8 Claims. (Cl. 74—82)

My invention relates to oscillatory driving mechanism, and more particularly to means for driving oscillatory sheet feeding members such as are employed in printing and duplicating machines and the like for advancing sheets of impression paper in succession to the printing couple of such machines. The invention is particularly adapted for use in connection with the paper forwarding means of stencil duplicators such as that described in my application for patent entitled "Control Means for Duplicating Machines," filed concurrently herewith, and it has been described in connection with such a machine. It is to be understood, however, that the invention is not limited to use with devices of this nature.

One of the objects of my invention is to provide driving mechanism of the character designated which will produce a smooth and accurate motion of the driven element, which will decelerate and stop the forward or feeding motion within a small angular travel of the driven element, and will rapidly reverse such element without excessive shock.

Another object of the invention is to provide oscillatory driving mechanism having means for absorbing and storing energy from the moving parts during deceleration thereof at the end of forward movement, and releasing the stored energy to assist the rapid reversal of the mechanism.

Another object of the invention is to provide an oscillatory drive which forms a closed system between the forward and the return driving members, including an improved compensation or take-up mechanism which will maintain normal operating tension and take up backlash and wear without impairing the accuracy of registration of the driven sheet forwarding elements.

A further object of the invention is to provide an oscillatory drive having a spring operated take-up device which shall operate at different load ranges in different portions of the driving cycle without material change in the amplitude of movement of the driven elements.

Other objects of the invention will appear from the following description taken in connection with the drawings, which form a part of this specification, and in which.

Figure 1:
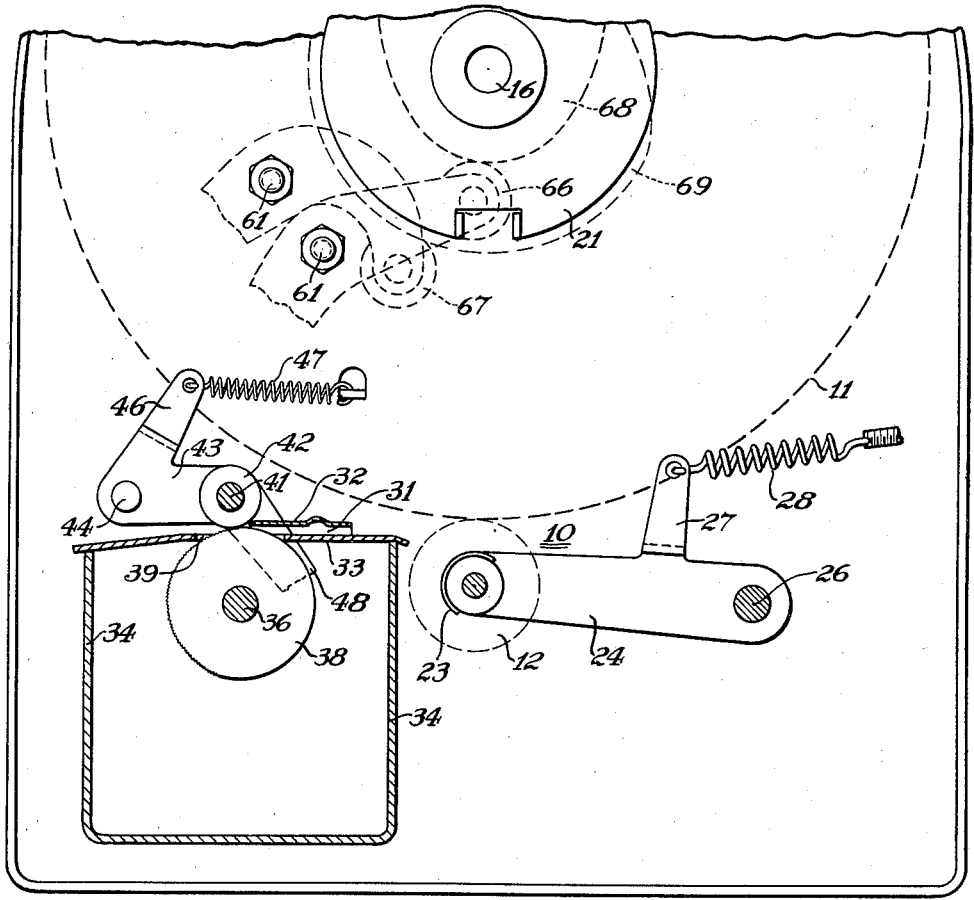
Fig. 1 is a vertical, longitudinal section through a duplicating machine, showing elements of the printing couple and sheet forwarding device to which my invention is applicable.
Figure 2:
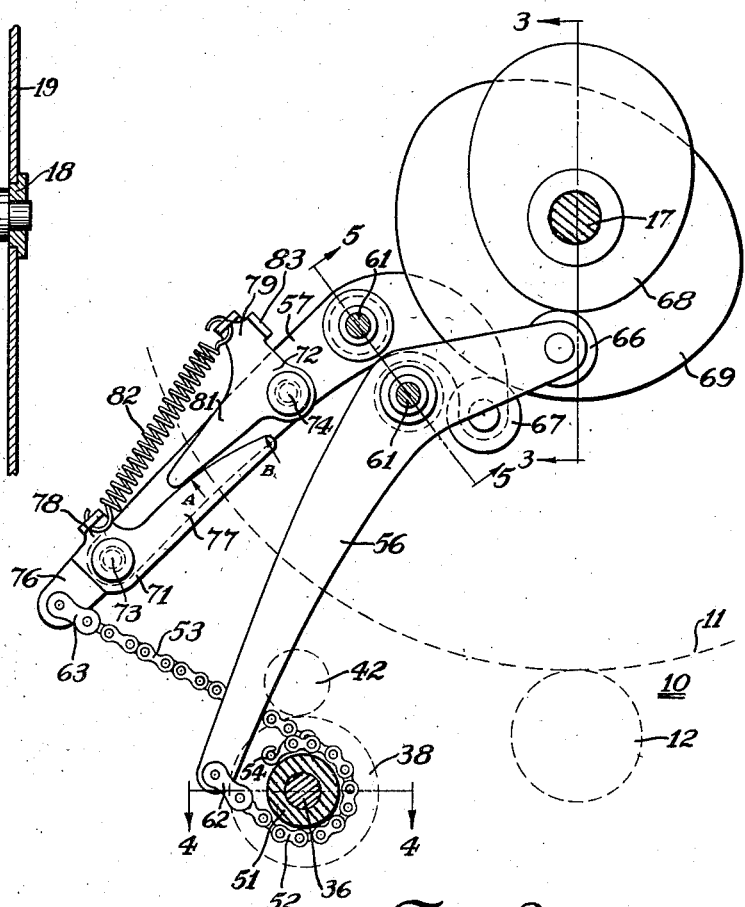
Fig. 2 is a view of a part of the machine of Fig. 1, partly in side elevation and partly in section substantially on the lines 2—2 of Figs. 3 and 4, the relative position of the printing couple and the sheet forwarding rolls being indicated by dotted lines.

Referring to the drawings, at 10 in Figs. 1 and 2 is indicated the printing couple of a duplicating machine to which my invention is applicable, which printing couple comprises a cylinder 11 adapted to carry a printing member such as a duplicating stencil, and a cooperating impression roller 12. The printing couple is supported between the side frame members of the machine, one of which is shown at 13, which may be provided with suitable covers or housings 14 to enclose the machine parts mounted thereon. The cylinder 11 is rotatably mounted in trunnion bearings 16, one of which is formed in the end of a shaft 17, journaled in bearings 18 in the frame member 13 and a spaced bracket plate 19 secured thereto. The inner end of the shaft 17 carries a flange 21 adapted for driving connection to the cylinder, and also a gear 22 through which it may be driven by other gears and a suitable source of power such as an electric motor, not shown.

The impression roller 12, of rubber or other suitable material, is rotatably mounted at its ends in bearings 23 each carried at the end of a lever 24 which is pivotally mounted as at 26 on the adjacent side frame member of the machine. Each of the levers 24 is formed with an arm 27 which is connected by a spring 28 to the adjacent frame member, which springs 28 tend to turn the levers 24 on their pivots so as to resiliently urge the impression roller upward toward operative contact with the cylinder. Since the specific construction of the elements of the printing couple 10 form no part of the present invention, further and more detailed description of the cylinder and its drive, and the impression roller, is unnecessary and has been omitted.

Figure 4:
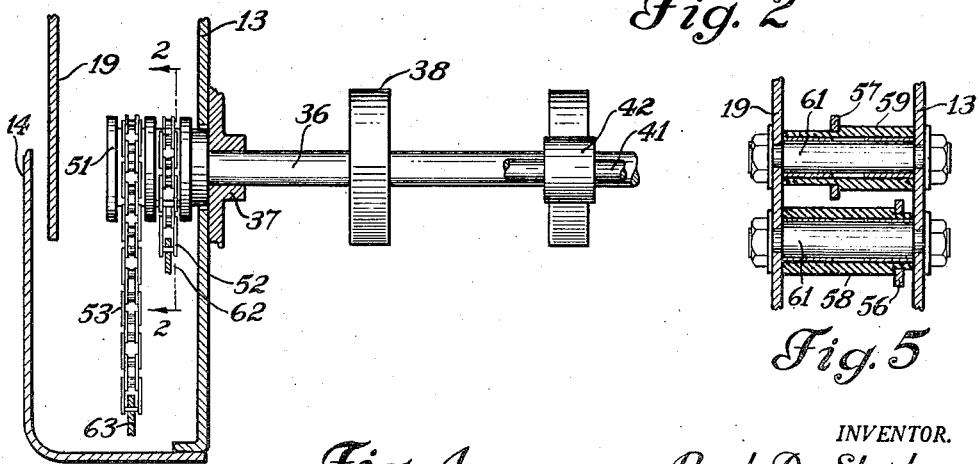
Fig. 4 is a fragmentary view, partly in plan and partly in section substantially on the line 4—4 of Fig. 2.
Figure 5:
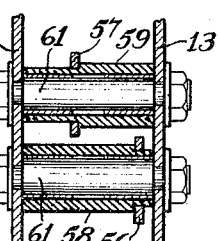
Fig. 5 is a detail section substantially on the line 5—5 of Fig. 2.

The machine is provided forwardly of the printing couple with a sheet forwarding device adapted to receive sheets of impression paper advanced in succession from any suitable feeding device, not shown, accelerate each sheet to cylinder speed and feed it into the crotch of the printing couple in timed relation to the machine. The machine is provided forwardly of the printing couple with a paper chute 31, indicated in Fig. 1, consisting of a pair of spaced plates 32 and 33 which extend across the machine between the side frame members and are disposed at an angle to receive and guide the sheets of paper. The lower plate 33 may be mounted on cross frame members 34 between which the forwarding means is supported. This forwarding means includes a shaft 36 extending across the machine and journaled in bearings 37 mounted on the frame members 13. The shaft 36 extends through one of the bearings 37, as shown in Fig. 4, and is driven by the driving means of this invention so as to impart an oscillating motion thereto in timed relation to the rotation of the cylinder.

Mounted on and rigidly secured to the shaft 36 are a number of paper forwarding rolls or segments 38, spaced across the machine. These rolls 38 project a small amount through slots 39 provided in the plate 33, into the chute 31, and they are preferably serrated or roughened over that portion of their circumference which corresponds to the sheet forwarding portion of their oscillatory movement, as shown in Fig. 4. Above and parallel to the shaft 36 is a shaft 41 on which are mounted a number of gripper rollers 42, preferably of rubber or similar resilient material, each of which is disposed in the vertical plane of one of the oscillatory forwarding rolls 38. The shaft 41 and its gripper rollers 42 are not positively driven but are adapted to be raised and lowered as a unit in proper time with the machine so as to grip each of the sheets of paper as these are fed against the adjacent roll 38. To provide this action the shaft 41 is rotatably mounted at its ends in suitable bearings, not shown, carried by bell crank levers 43, each of which is pivotally mounted as at 44 on the adjacent frame member 13. The levers 43 are formed with upstanding arms 46 to which are connected tension springs 47 which urge the levers to turn so as to depress the shaft 41 and its rollers into engagement with the oscillating rolls 38. The levers 43 are also formed with a downwardly projecting arm 48, each of which is adapted to be actuated in any convenient manner, as by a cam driven from the machine, not shown, so as to raise the levers 43 and with it the shaft 41 and rollers 42 in the proper time relation to the cycle of the machine. As this mechanism is fully described in my copending application above identified, and as it forms no part of the present invention, further description has been omitted.

The driving means of this invention includes a pair of adjacent sheaves or pulleys 51, secured to the projecting end of the oscillating shaft 36 and adapted to be actuated alternately in opposite directions by means of chains or cables 52 and 53. As best shown in Fig. 2, these chains are wound or trained about the shaft 36 in opposite directions, and the end of each chain is secured to its sheave by means of a suitable terminal link or anchor 54. The chains are so disposed and connected to the sheaves that when one is fully wound on its sheave, the other is fully unwound, the unwinding of each chain operating to wind on the other as will be readily understood.

The chains are connected to and alternately actuated by a pair of levers 56 and 57 secured respectively to bearing sleeves 58 and 59 and laterally offset so as to pass in parallel planes with a scissors motion. The sleeves are pivotally mounted on pins 61 carried by the frame member 13 and the bracket plate 19. The lever 56, which actuates the forwarding or sheet advancing motion of the rolls 38, is directly connected to the end of chain 52 as by a shackle 62, while the lever 57 which actuates the return movement of the rolls is similarly connected by a shackle 63 to the chain 53 through a compensating or take-up device, presently to be described.

The levers 56 and 57 are provided at their driven ends with roller cam followers 66 and 67 respectively; the follower 66 being engaged and operated by a driving cam 68 and the follower 67 by a driving cam 69. These cams are conveniently fixed on the shaft 17, so that they are continuously driven with and in fixed angular relation to the cylinder 11. It will be understood that the driving cams 68 and 69 are substantially complementary, being so designed as to produce alternate and opposite sweeps or strokes of the levers 56 and 57. They may be designed, however, with small departures from true complementary shapes, to secure any desired variant from an equiangular scissors motion of the levers. Thus, upon completion of the return movement of the shaft 36, the cam 68 may impart to the lever 56 a small preliminary forward movement, adapted to bring the first serrations of the rolls 38 into sheet gripping position beneath the gripper rollers 42. This movement is followed by a perceptible dwell during which the arm 56, the chain 52 and the shaft and its rolls 38 are stationary, while the next sheet is being fed into the forwarding device, aligned with the printing couple and gripped in forwarding position by the gripper rollers 42.

Figure 6:
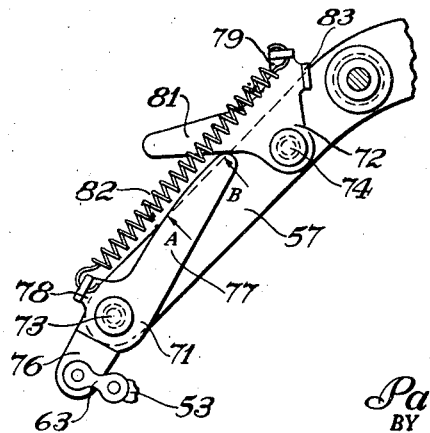
Fig. 6 is a detail view of part of the mechanism shown in Fig. 2, illustrating the action of the parts in another position of the mechanism.
Figure 3:
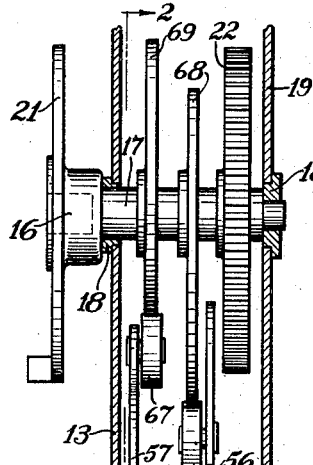
Fig. 3 is a fragmentary view, partly in elevation and partly in section substantially on the line 3—3 of Fig. 2.

To permit such variants in the oscillatory motion of the shaft 36 while maintaining the elements of the system under an operating tension, and also to provide for smooth and rapid transition from forward motion to return motion of the drive, my invention includes a compensating and take-up device best shown in Figs. 2 and 6. In the preferred form illustrated the device is carried by the return motion lever 57 and comprises a pair of oppositely disposed bell crank levers 71 and 72 which are pivotally mounted thereon as at 73 and 74 respectively. The pivot 73 of the bell crank 71 is located substantially at the end of the lever 57, and this bell crank is provided with an arm 76 which forms an extension of the lever 57 and carries the shackle 63 by which the return chain 53 is connected to this lever, as previously described. The bell crank 71 is also provided with a cam arm 77, disposed oppositely to the arm 76, and with an abutment arm 78 substantially perpendicular to the arms 76 and 77.

The bell crank 72 is formed with an abutment arm 79, and with a cam arm 81 substantially perpendicular thereto, the arm 81 being disposed oppositely to and in the same plane with the cam arm 77 so that the edges of these cam arms are adapted for sliding contact. The abutment arms 78 and 79 are connected by a suitable tension spring 82 which tends to turn the bell cranks 71 and 72 on their respective pivots in opposite directions. Thus the bell crank and its associated arms are urged to pivot in a clockwise direction as viewed in Fig. 2, being opposed by the counterclockwise pull of the chain 53 on the arm 76. The cam edge of the arm 77 is formed with a somewhat curved profile which is in sliding engagement with the substantially straight cam edge of the arm 81, contact point or fulcrum A between the cam arms being in the middle portion of the arm 77 during the greater part of each cycle of the machine. This fulcrum shifts slightly along the cam profiles in response to small pivotal movements of the bell cranks, the tension in the chains being balanced by the tension in the spring 82. The extreme limit of movement of the cam levers may be limited however as by means of a stop or pad 83, carried by the bell crank 72 and adapted to contact the bearing 59 so as to prevent the disengagement of the cam arms upon an extreme pivotal movement thereof.

It will be evident from the foregoing description that the take-up device of my invention operates to maintain a moderate tension through the whole system, the tension of the spring 82 being transmitted through the bell crank 72 to the lever 57 and cam 69 in one direction and through the bell crank 71 to the chain 53, the sheaves 51, the chain 52 and the lever 56 to cam 68 in the other direction. In this way a resilient force is introduced in the system to take up small changes due to wear, stretching of the parts and the like, and to hold the cam followers against the cams without the necessity for continuous heavy cam pressures. It will also be noted that my device does not impair the registration of the paper forwarding rolls with respect to the printing couple, the drive to the shaft 36 on the paper forwarding stroke having no extensible elements.

The same mechanism also provides means to stop the motion promptly and accurately within a small angle of movement at the end of the forward stroke, and start the return movement immediately without noise or shock, and without cam bounce. The device operates to greatly increase the tension, momentarily, for a few degrees of travel at the end of the forwarding stroke. The energy necessary to so increase the tension is removed from the momentum energy of the moving elements and thus acts to decelerate the system. At the same time the energy removed from the system is stored in the spring and is returned at the beginning of reverse motion to assist the acceleration on the return stroke.

The operation will be apparent from Fig. 6, showing the position of the parts at the end of the forward stroke. The bell crank 71 has made a relatively large pivotal movement in response to greatly increased tension on the chain 53, this tension being increased by resistance of the cam 69 to further wind-up motion of lever 57. This pivotal movement moves the cam arms 77 and 81 through the position in which their axes are parallel so that the fulcrum shifts instantaneously from the point A to a point B adjacent the end of arm 77. Upon and after such shift of fulcrum, relatively small angular movements of the bell crank 71 produce relatively large angular movements of the bell crank 72, resulting in rapid extension of the spring 82 and a quick build up of its resistance to movement of the lever 57. Energy being thus removed from the lever 57 and stored in the spring 82, the system is quickly and smoothly brought to rest. At this moment in the cycle, the cam 68 moves the lever 56 through its preliminary forwarding movement as previously described and the cam 69 releases pressure on the lever 57. This permits the spring 82 to contract toward its normal deflection, its energy being fed back into the lever 57 to accelerate the return motion of the system.

What I claim is:

1. In an oscillatory shaft drive, chains adapted to rotate the shaft alternately in opposite directions, an actuating lever for each of said chains, means to simultaneously oscillate the levers in opposite directions, and means connecting each lever to one of the chains, one of said means including a pivoted arm connected to the associated chain, a pivoted arm actuated by said first arm, and a spring connected between said arms.

2. In an oscillating drive for the shaft of a sheet forwarding device, chains adapted to oscillate the shaft in opposite directions, a lever adapted to actuate each chain, and compensating means carried by one of the levers yieldably connecting said lever to its chain, said compensating means including a spring and mutually cooperating cam arms connected to said spring.

3. In an oscillatory shaft drive, chains adapted to oscillate the shaft, a lever adapted to actuate each of said chains, a bell crank pivotally mounted on one of said levers and connected to the associated chain, a second bell crank pivotally movable on said lever in response to movements of said first named bell crank, and a spring operatively connecting said bell cranks.

4. In an oscillatory shaft drive, chains adapted to rotate the shaft alternately in opposite directions, a lever adapted directly to actuate one of the chains, a second lever having bell cranks pivotally mounted thereon each having a cam arm slidably contacting the cam arm of the other, a spring connected between said bell cranks, and means connecting one of the bell cranks to the other chain.

5. In an oscillating shaft drive having chains adapted to rotate the shaft alternately in opposite directions, a lever adapted to actuate each of the chains, one of the levers being connected to one of the chains, bell cranks pivotally mounted on the other lever, one said bell crank being connected to the end of the other chain, each of said bell cranks having a cam arm slidably contacting the cam arm of the other bell crank, and spring means connected between said bell cranks to resist pivotal movement of the chain connected bell crank caused by tension in said chain.

6. In an oscillating shaft drive having chains adapted to rotate the shaft alternately in opposite directions, a lever adapted to actuate each of the chains, one of the levers being connected to one of the chains, and means connecting the other lever to the other chain, said means including spaced bell cranks pivotally mounted on said lever each having a cam arm slidably contacting the cam arm of the other, a second arm on each of the bell cranks, a spring connecting said second arms, and a third arm on one of the bell cranks connected to said other chain.

7. In an oscillating shaft drive having chains adapted to rotate the shaft alternately in opposite directions and a pair of driven levers each adapted to actuate one of the chains, one of said levers being directly connected to one of said chains, energy storing means carried by the other lever and connecting the other chain thereto, said means comprising a pair of bell cranks having engaging cam members adapted to rapidly change the moment arm upon pivotal movement of said bell cranks, an arm on one of said bell cranks connected to said other chain, and a spring connected between said bell cranks to oppose pivotal movement caused by tension in said chain.

8. In an oscillating shaft drive having chains adapted to rotate the shaft alternately in opposite directions and a pair of driven levers each adapted to actuate one of the chains, one of said levers being directly connected to one of said chains, energy transfer means connecting the other lever to the other chain, said means comprising a pair of pivoted members having arms slidably engageable to vary the moment relation of the members upon pivotal movement thereof, a connection between one of the members and said other chain, and a spring connected between said members to oppose pivotal movement caused by tension in said chain.

PAUL A. STEPHENSON.

REFERENCES CITED

The following references are of record in the file of this patent:

UNITED STATES PATENTS

| Number | Name | Date |
| --- | --- | --- |
| 562,124 | Doolittle | June 16, 1896 |
| 1,200,619 | Johnson | Oct. 10, 1916 |

FOREIGN PATENTS

| Number | Country | Date |
| --- | --- | --- |
| 476,179 | Germany | May 11, 1929 |